March 10, 1942. W. A. ANDERSON 2,275,671
ACCOUNTING MACHINE
Filed July 23, 1936 16 Sheets-Sheet 1

INVENTOR
WALTER A. ANDERSON.
BY
ATTORNEY

March 10, 1942. W. A. ANDERSON 2,275,671
ACCOUNTING MACHINE
Filed July 23, 1936 16 Sheets-Sheet 4

INVENTOR
WALTER A. ANDERSON.
BY
ATTORNEY

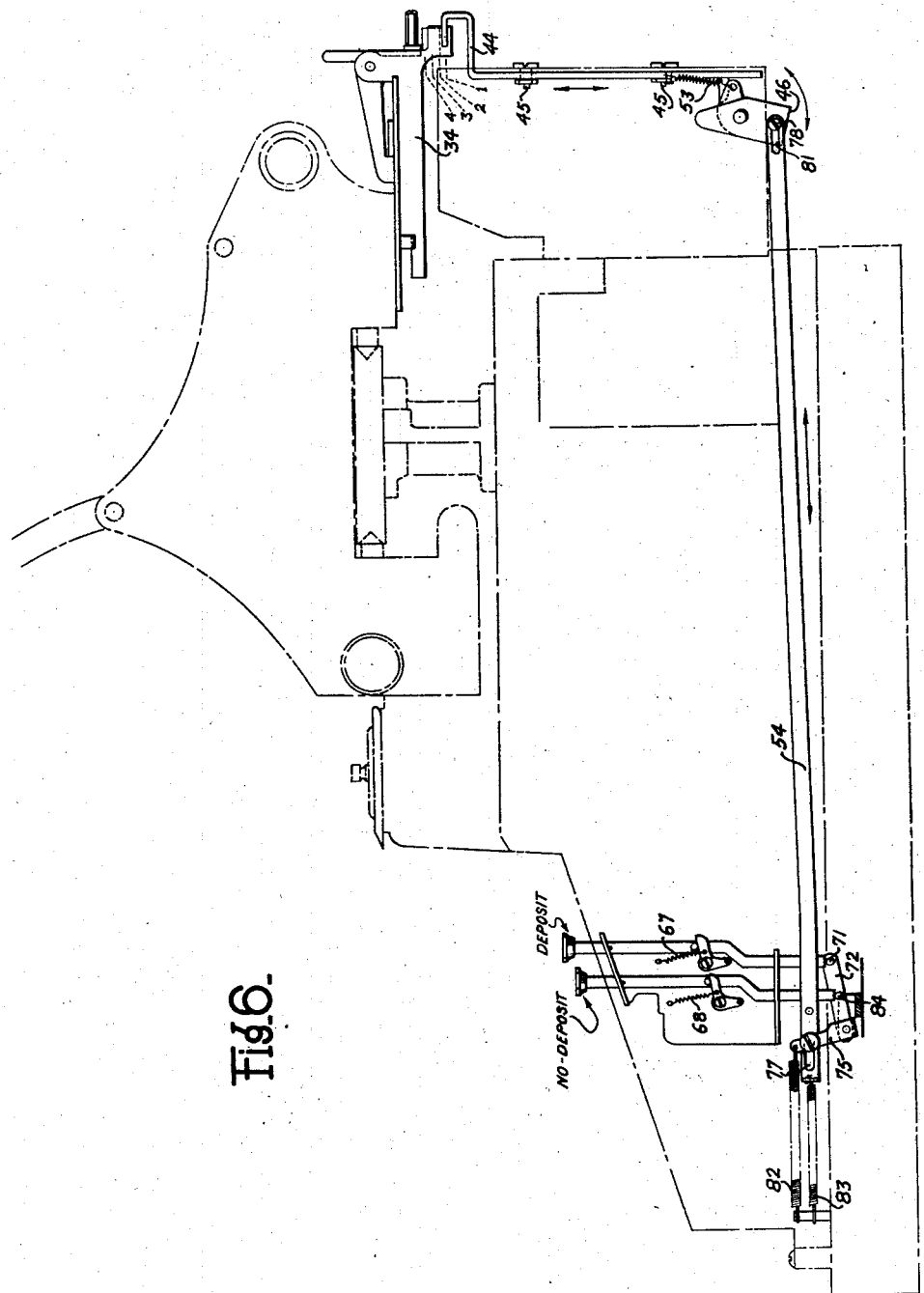

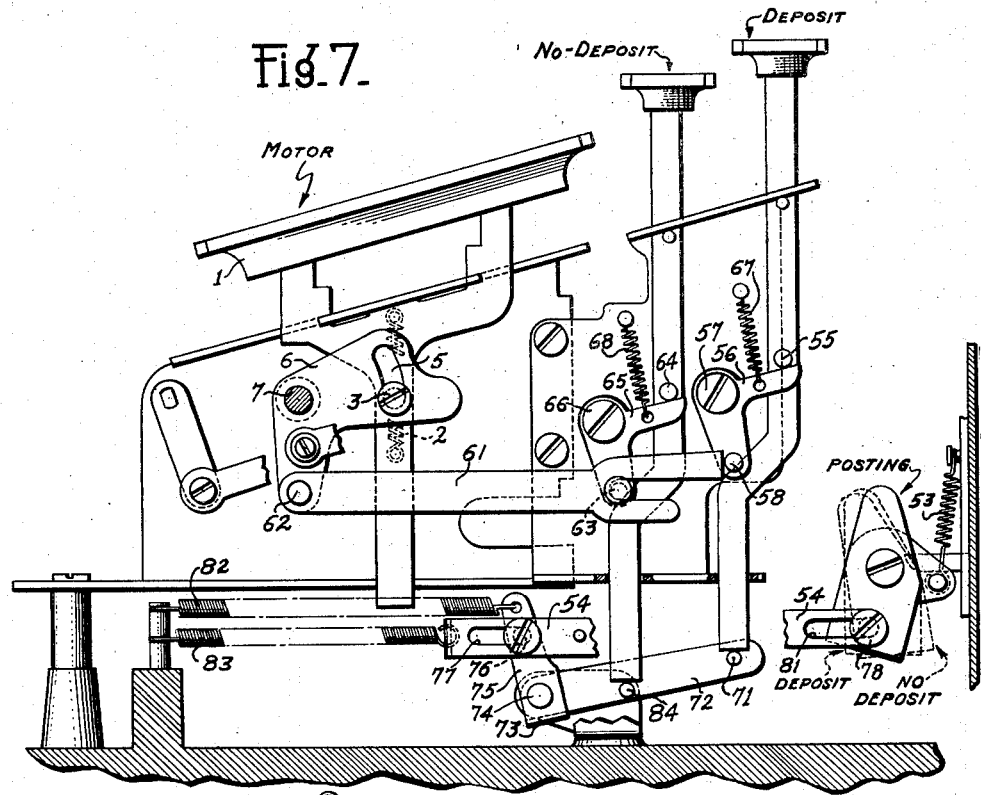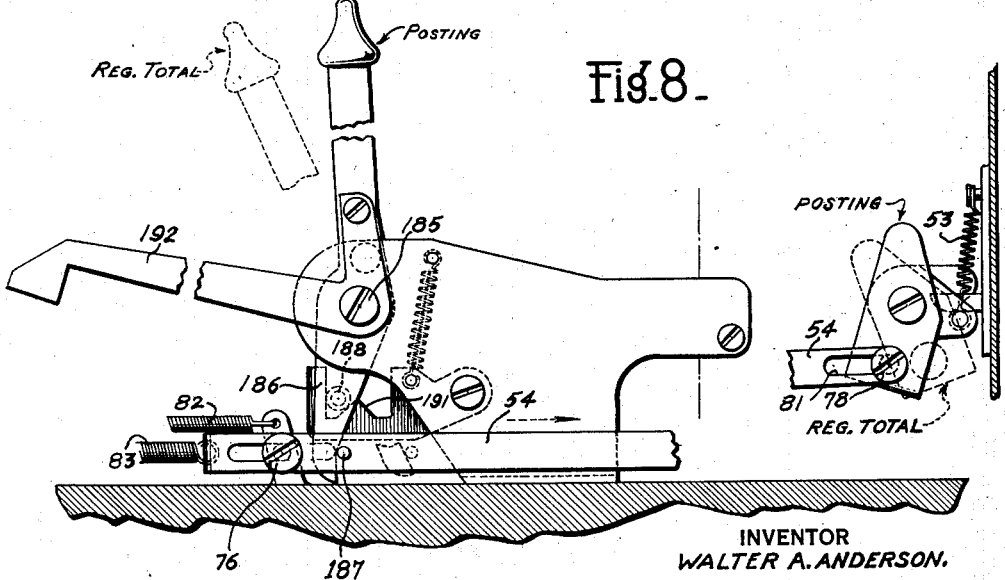

March 10, 1942.　　W. A. ANDERSON　　2,275,671
ACCOUNTING MACHINE
Filed July 23, 1936　　16 Sheets-Sheet 7
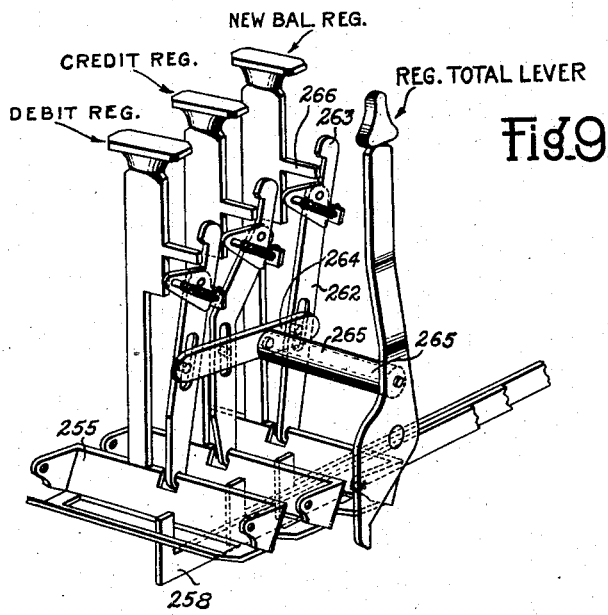
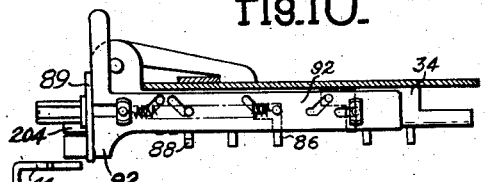
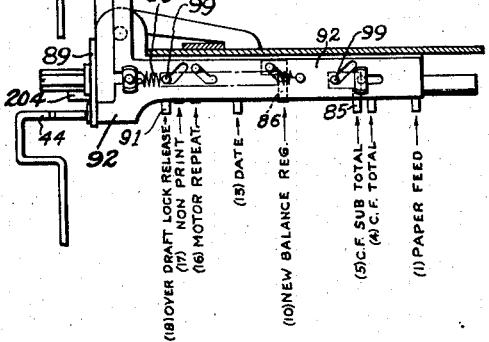
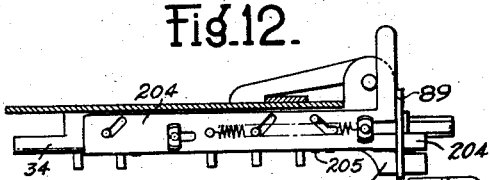
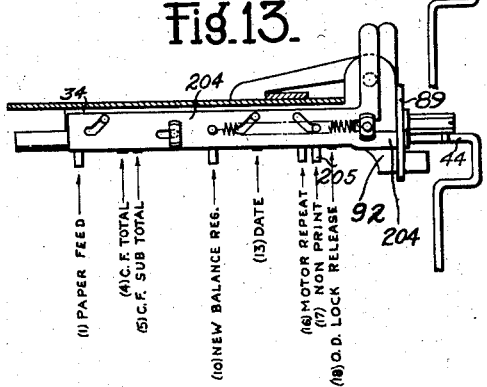
INVENTOR
WALTER A. ANDERSON.
BY
*L. G. Julihn*
ATTORNEY

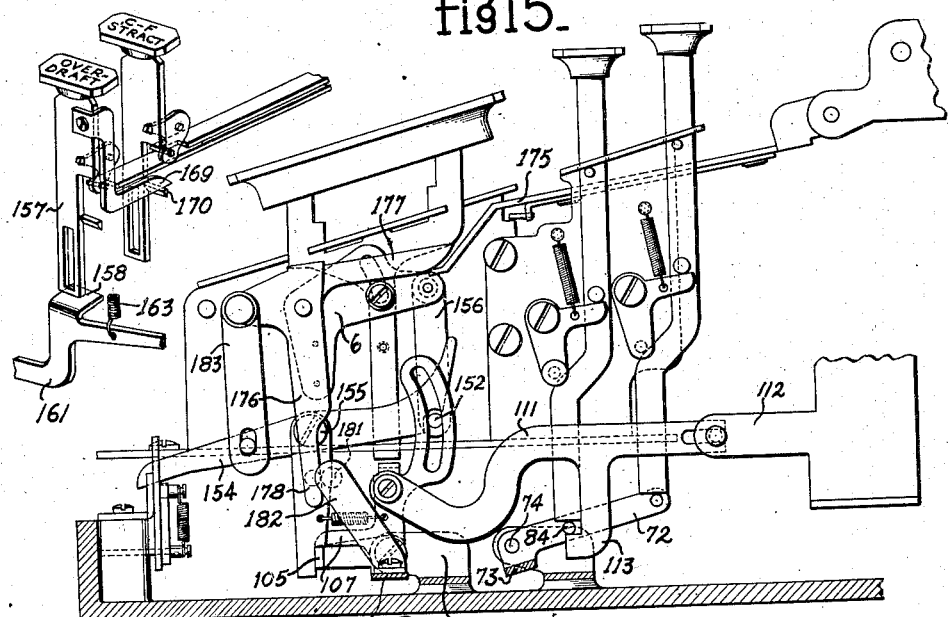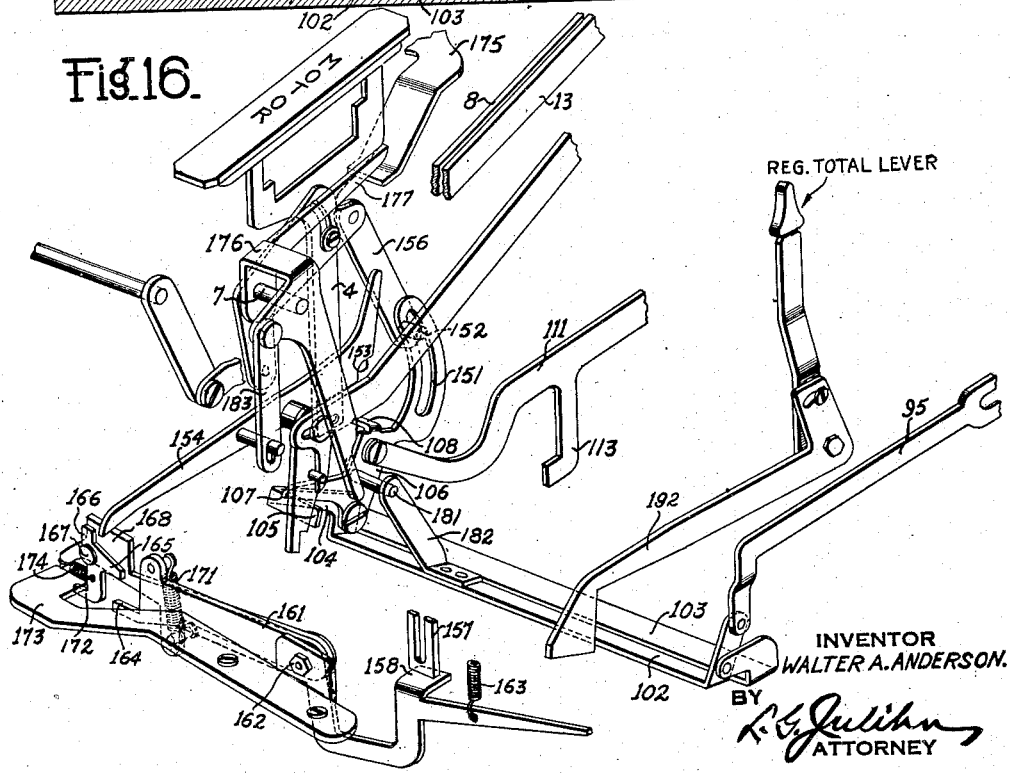

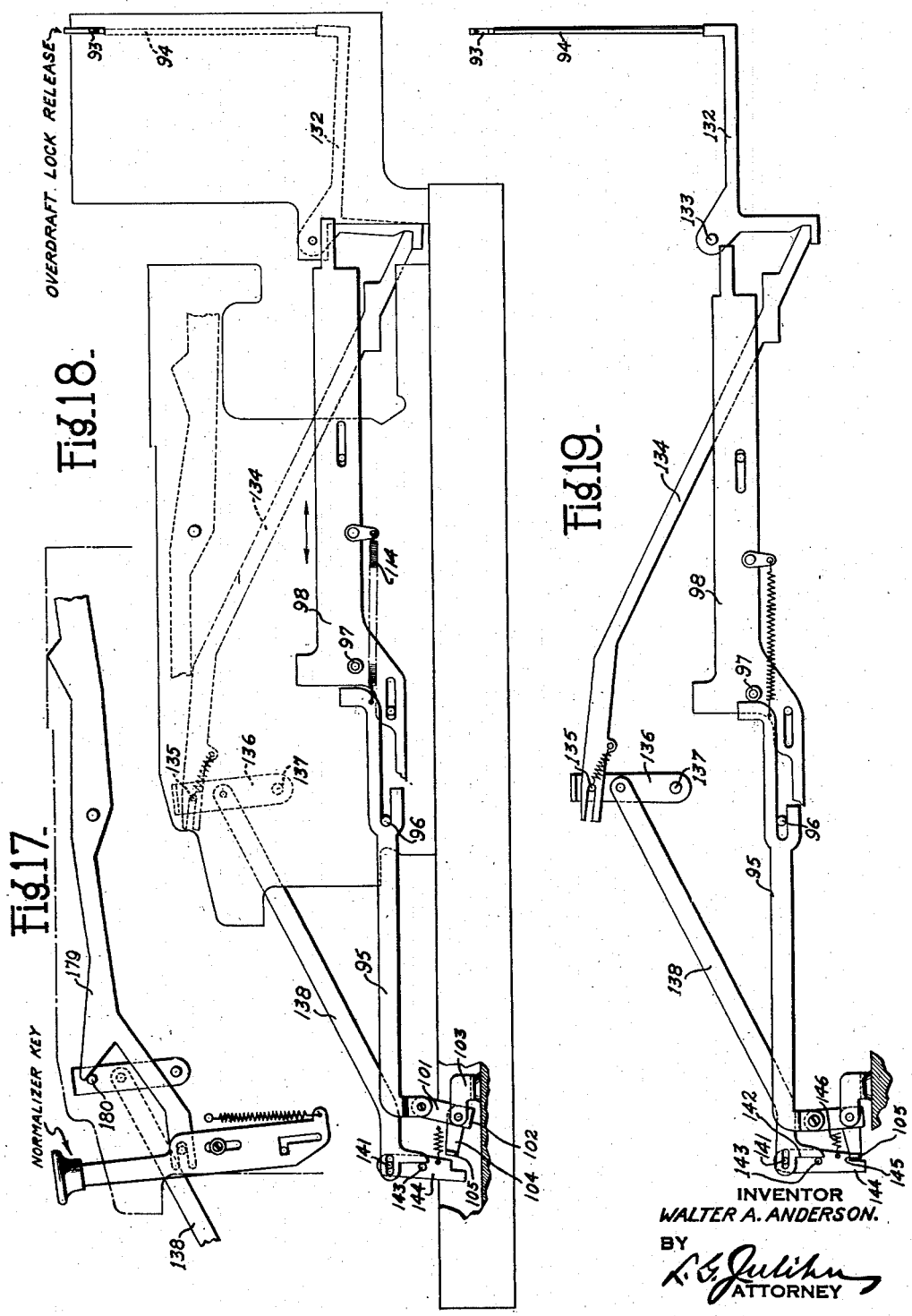

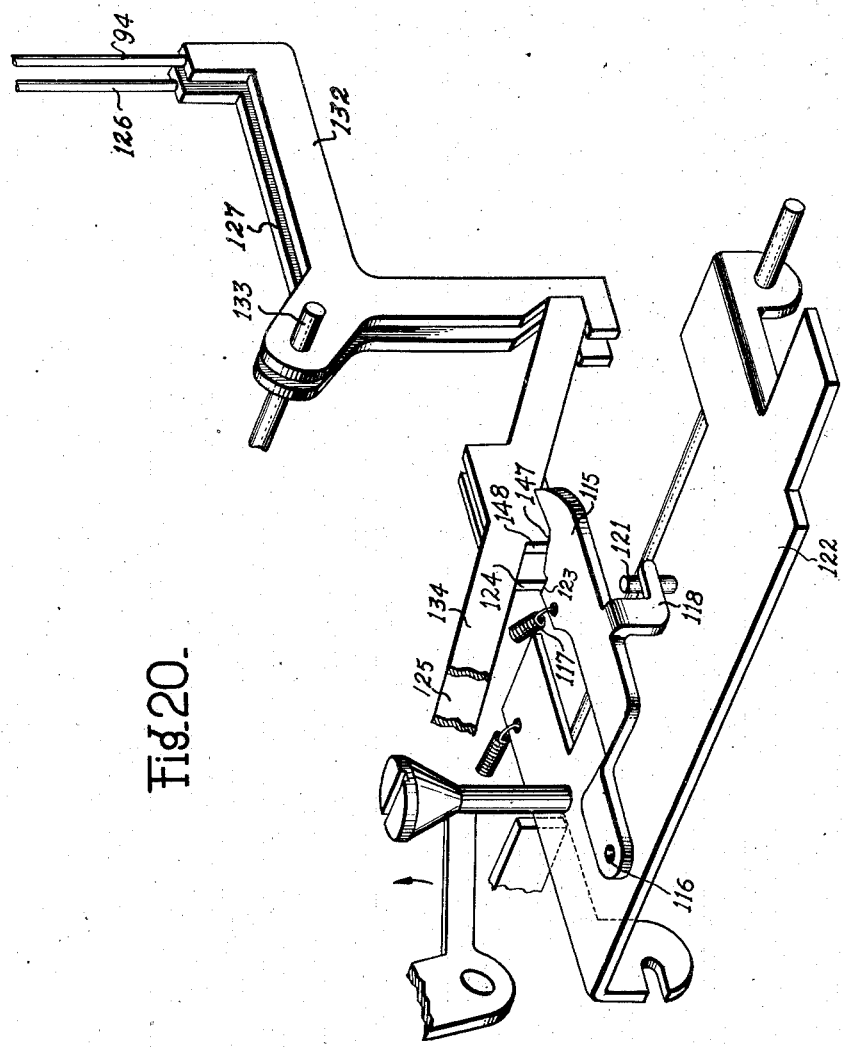

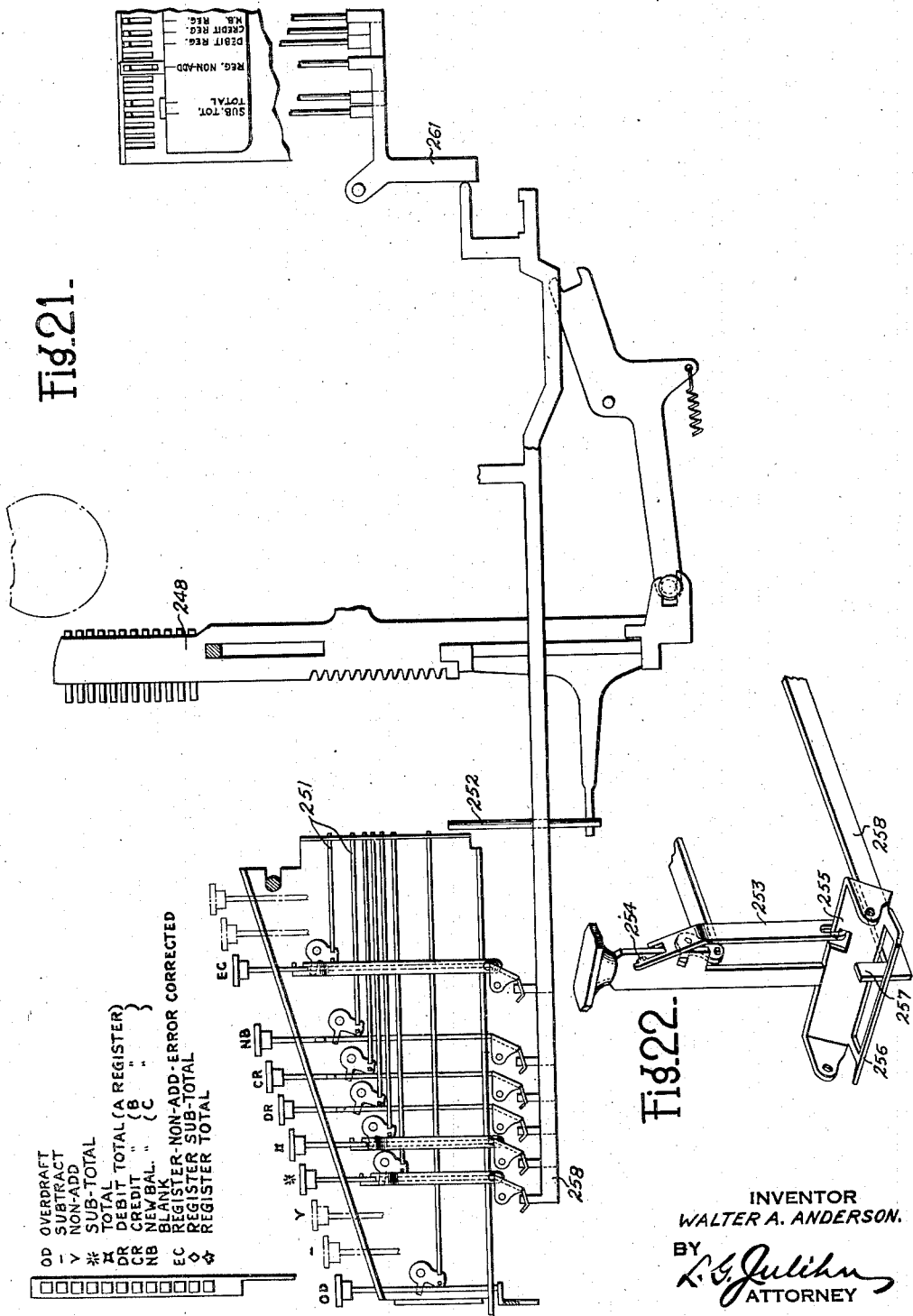

March 10, 1942. W. A. ANDERSON 2,275,671
ACCOUNTING MACHINE
Filed July 23, 1936 16 Sheets-Sheet 12
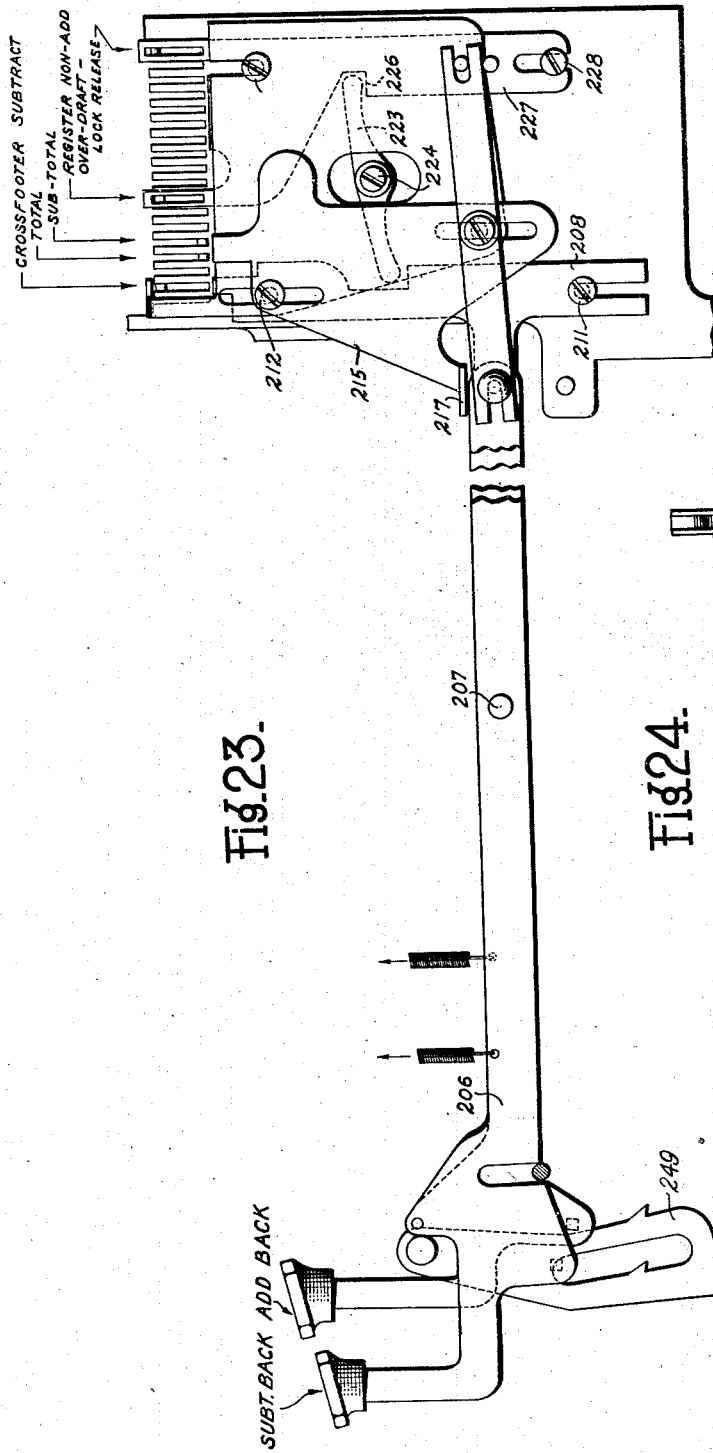
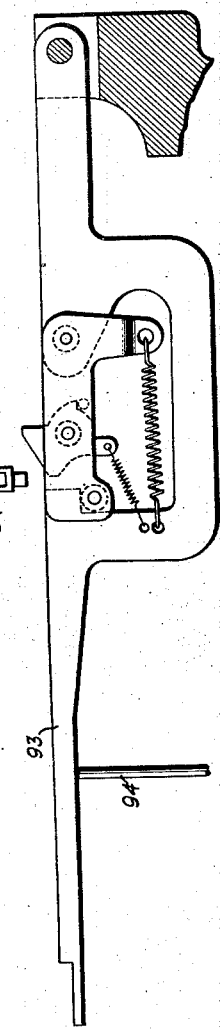
INVENTOR
WALTER A. ANDERSON.
BY
ATTORNEY

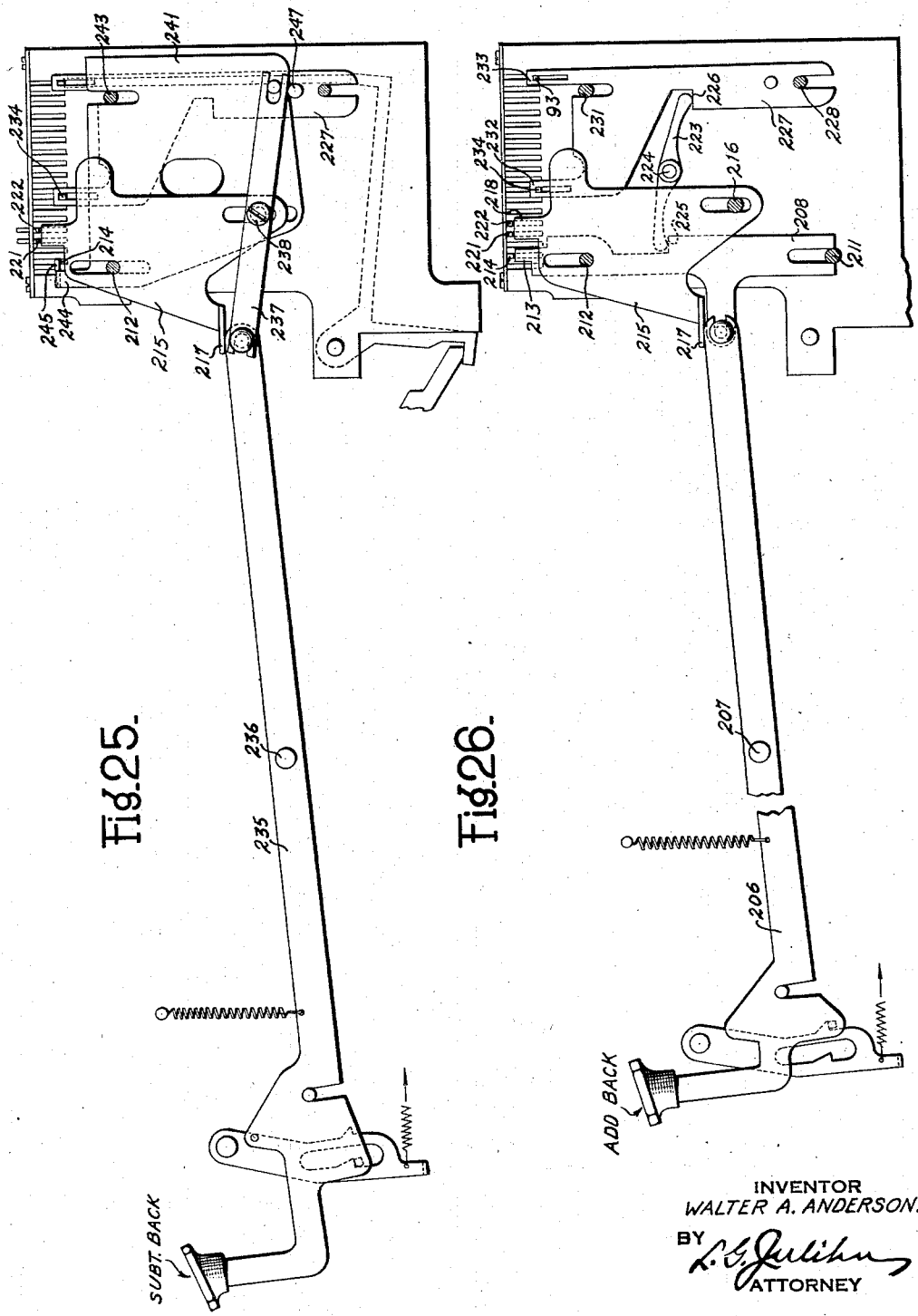

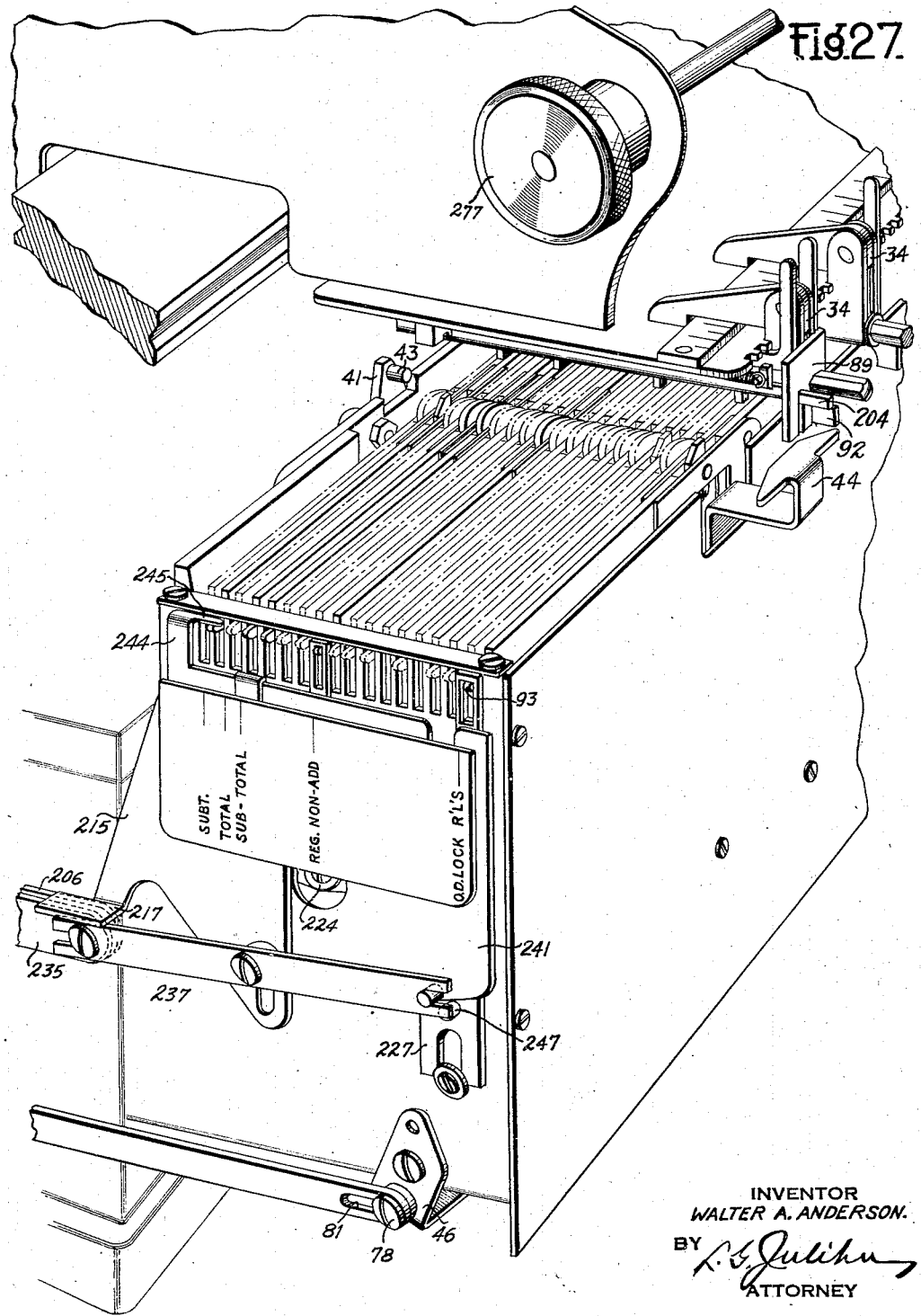

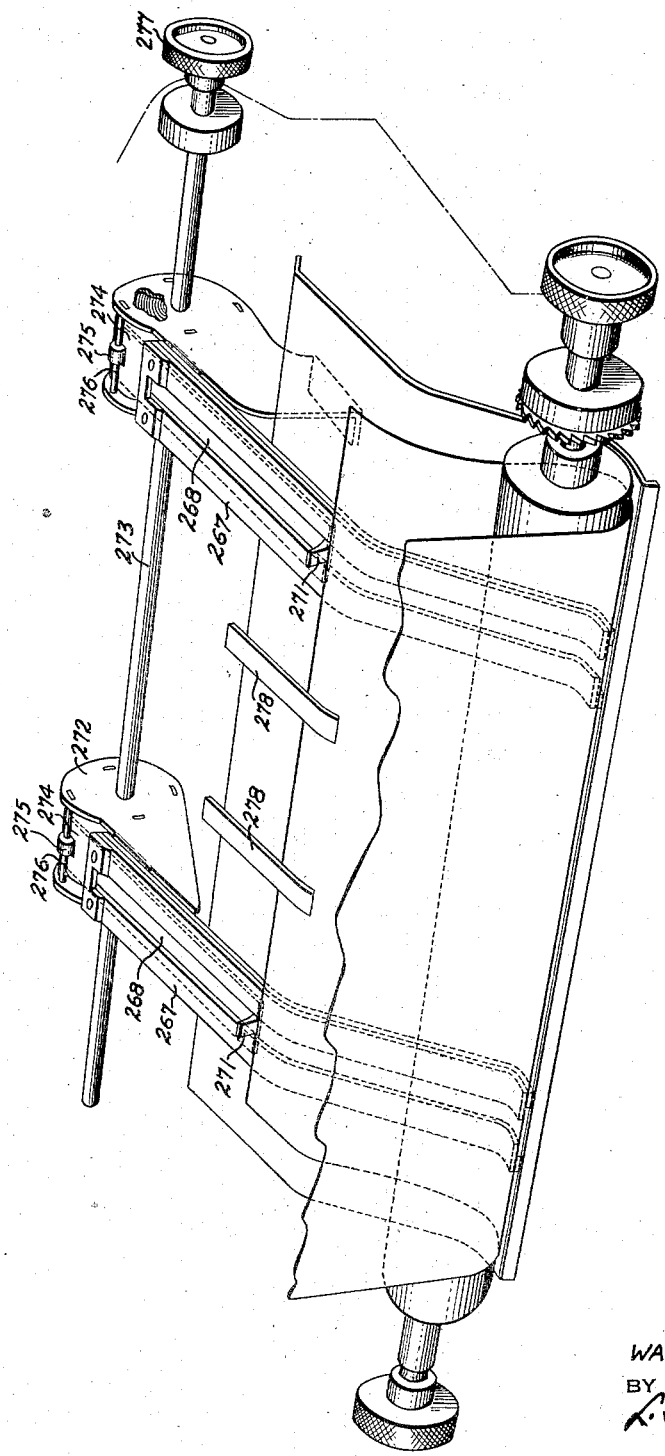

March 10, 1942.  W. A. ANDERSON  2,275,671
ACCOUNTING MACHINE
Filed July 23, 1936  16 Sheets-Sheet 16

Fig.29.

INVENTOR
WALTER A. ANDERSON.
BY
L.G. Julihn
ATTORNEY

Patented Mar. 10, 1942

2,275,671

UNITED STATES PATENT OFFICE 2,275,671

ACCOUNTING MACHINE

Walter A. Anderson, Bridgeport, Conn., assignor to Underwood Elliott Fisher Company, New York, N. Y., a corporation of Delaware Application July 23, 1936, Serial No. 92,164

2 Claims. (Cl. 197—177)

This invention relates to accounting machines, and more particularly to the type of machine used for posting patrons' accounts in banking houses, although the invention is not limited to machines for performing this particular type of work.

In posting such items as checks and deposits, it is customary to post two or more checks in successive columns and to post the deposits in another column. Since, in a large number of instances, there are fewer checks than the number of columns provided for them, and since there are at times either no checks or no deposits to be recorded, it becomes necessary to tabulate the machine through these various columns until the desired column is reached. Such tabulation requires the careful attention of the operator, and therefore slows up the work. It is accordingly an object of the present invention to provide tabulating keys which cause the machine to tabulate through the undesired columns and stop when the proper column is reached.

It is a further object of the invention to use one of these tabulating keys for printing a subtotal at the top of a second statement sheet, when the first sheet becomes filled and it is desired to carry the balance over and print it on the second sheet without the inconvenience of depressing a special combination of control keys.

In posting transactions it is frequently desirable to prevent operation of the machine through the conventional starting means, whenever a patron's account has been overdrafted. Therefore, it is another object of the invention to lock the motor keys against depression and to disable the carriage control of the starting mechanism whenever an overdraft appears in the register and the machine is in condition for taking a total.

Another object of the invention is to provide a special key for taking totals of overdraft amounts, and for printing them in such a manner that they are readily distinguishable on the record sheet.

After an operator has posted a day's run, it is necessary to take the totals from the individual registers that accumulate the checks, deposits and new balances. Such totals should be accompanied by distinguishing symbols to identify the registers from which they are taken. It is, therefore, another object of the invention to provide improved mechanism for taking totals from the individual registers in continuous operations of the machine and for automatically printing their identifying symbols in connection therewith.

Another object of the invention is to provide an improved mechanism to lock the keyboard during the continuous operation of taking individual totals.

When an erroneous entry has been made, such for instance, as an improper check amount, it is customary to immediately set up this same erroneous amount in the same column and add the amount back to the patron's account to correct the error. It is evident, however, that although the crossfooter containing the patron's balance is now corrected, the register for accumulating the checks will not only still contain the erroneous entry but will contain twice the erroneous entry due to this amount being again entered therein during the correcting operation. It is, therefore, another object of the invention to provide a special key for use in such correcting operations, which will prevent the second introduction of the erroneous entry into the accumulating register. With such a provision, at the end of a day's run it is necessary only to subtract the amount of erroneous entries from the total in the accumulating register to get the correct total, instead of having to multiply the erroneous amount by two and then subtract it. This simplifies the work and avoids error. For erroneous deposit entries a similar key is provided which causes the erroneous entry to be subtracted from the crossfooter and prevents its entry in the accumulating register for deposits.

Another object of the invention is to provide a readily adjustable paper stop mechanism for the paper fed from the front of the platen.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 5:
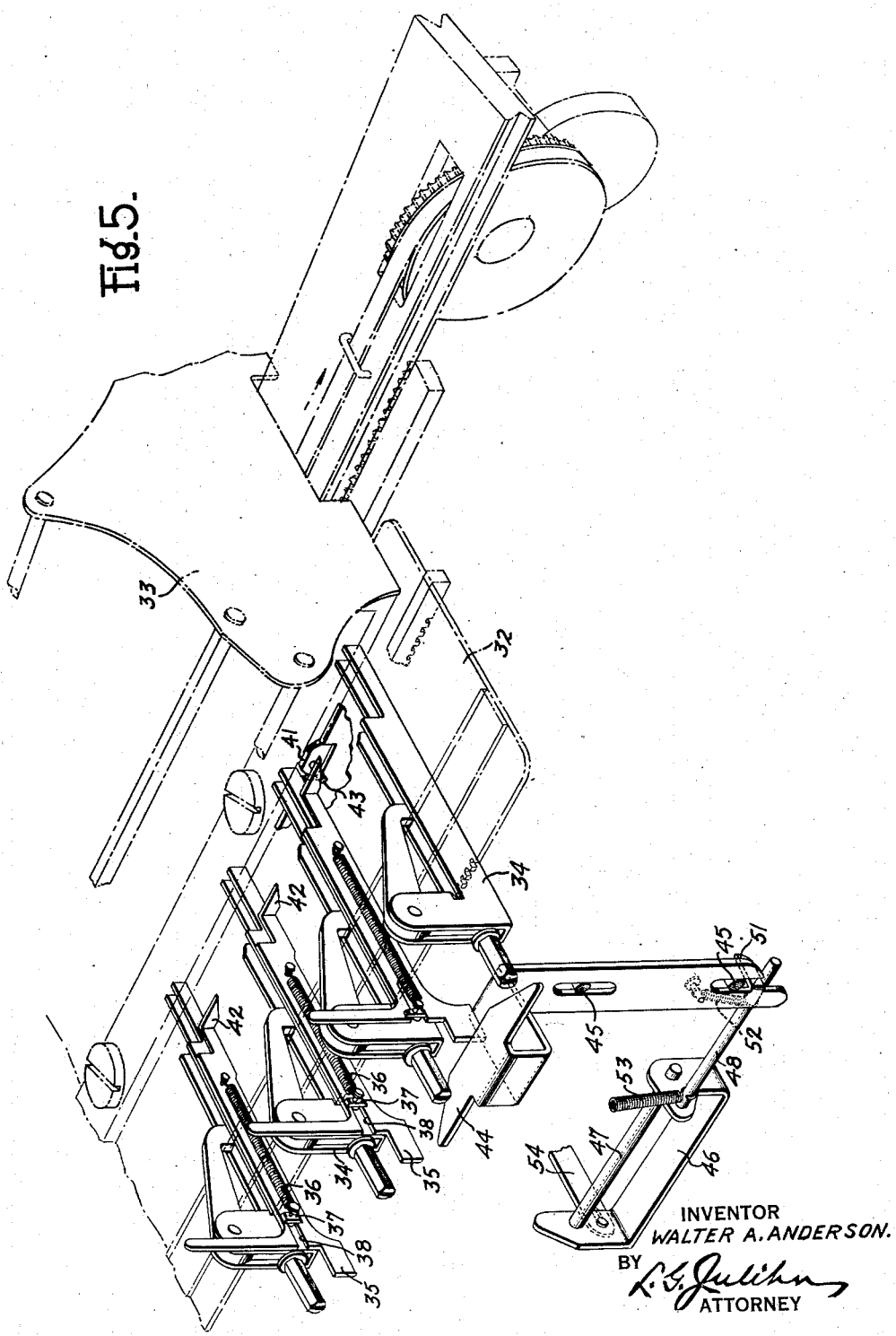

Figure 5 is a perspective of the rear left corner of the machine showing the tabulating control mechanism on the traveling paper carriage, Figure 6 is a right side elevation of the deposit and no deposit key structure and the connections between these keys and the paper carriage control, Figure 7 is a right side elevation of the deposit and no deposit key structure and the connections between these keys and the machine starting mechanism, Figure 8 is a right side elevation of the automatic total lever and its connections with the carriage controls, Figure 9 is a perspective of the accumulating register selecting keys and the connections for depressing these keys by the paper carriage, under control of the automatic total lever, Figure 10 is a left side elevation of the control magazine in the twelfth columnar position, showing the control slide on the left side of the magazine, Figure 11 is a view similar to Figure 10, showing the control slide on the left side of the magazine in its operated position, Figure 12 is a right side elevation of the control magazine in the twelfth columnar position, showing the control slide on the right side of the magazine, Figure 13 is a view similar to Figure 12, showing the control slide in operated position, Figure 14 is a perspective showing the connections between the overdraft key and the subtraction key and overdraft lock, Figure 15 is a right side elevation of parts of the connections between the overdraft lock and motor bar and deposit and no deposit keys, Figure 16 is a perspective of the overdraft lock and the connection for releasing it by depression of the overdraft key, Figure 17 is a right side elevation showing the connection between the normalizer key and the overdraft lock, Figure 18 is a right side elevation showing the connection between the customary overdraft slide and the overdraft lock, and also showing, in operated position, the overdraft lock release lever, operated by the paper carriage, Figure 19 is a right side elevation similar to Figure 18, but showing the overdraft slide in operative position, and the connection between the overdraft lock release lever and the overdraft lock, Figure 20 is a perspective of the connection between the overdraft mechanism and the carriage operated motor repeat and overdraft lock release slides, Figure 21 is a right side elevation of the control for printing the several identifying symbols, Figure 22 is a perspective showing the connection between certain of the keys shown in Figure 21 and the paper carriage, for depressing the key by movement of the carriage, Figure 23 is a right side elevation showing the add back and subtract back keys and their connections with the control levers operated by the paper carriage, Figure 24 is a back elevation of one of the control levers operated by the paper carriage, Figure 25 is a right side elevation showing, in operated position, the subtract back key and its connection with the control levers, Figure 26 is a right side elevation showing, in operated position, the add back key and its connection with the control levers, Figure 27 is a perspective of the right rear corner of the machine showing the paper carriage in relation to the control levers and also showing the connection between the control levers and the add back and subtract back keys, Figure 28 is a perspective showing the adjustable stop mechanism for the paper, and Figure 29 is a diagrammatic showing of the carriage controls, together with a sample work sheet.

General Description

This is an improvement on the machines disclosed in the applications of Oscar J. Sundstrand, Serial No. 581,800, filed December 18, 1931 (now Patent No. 2,194,270, March 19, 1940), and Serial No. 610,043, filed May 9, 1932 (now Patent No. 2,060,954, November 17, 1936). The machine includes one crossfooter and four accumulating registers, three of which are involved in the present invention. The machine is of the well-known ten key, key set, motor operated type, having a traveling paper carriage with a number of controls incorporated thereon for automatically causing the machine to perform its many functions in the proper columnar positions.

Detailed Description

Mechanism to start the machine

Figure 4:
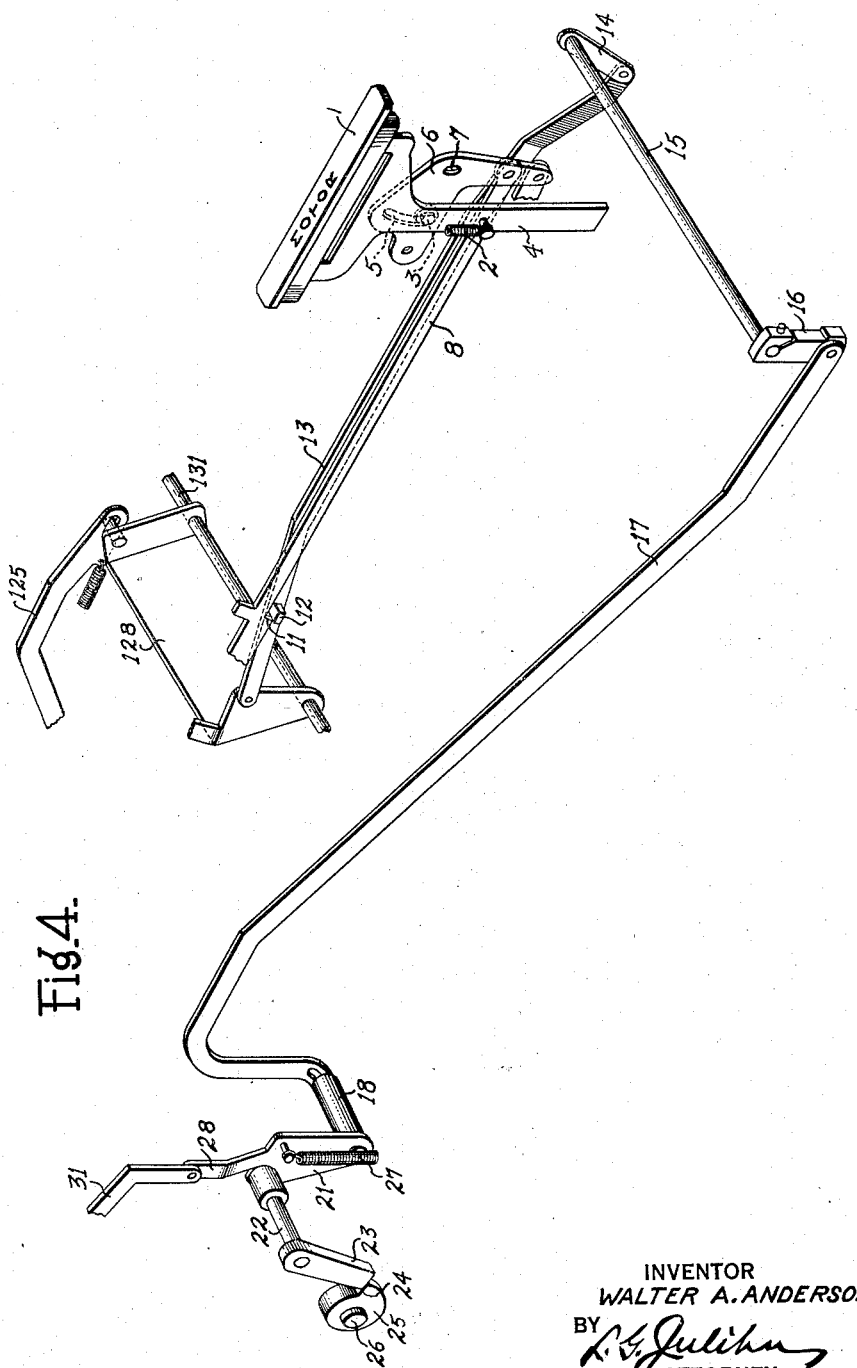
Figure 4 is a perspective of the machine starting mechanism.

Referring to Figure 4, a motor bar 1 is mounted in the machine frame for vertical movement, and is held in its upper position by a spring 2. A stud 3 on the stem 4 of the motor bar rests normally in the bottom of a slot 5 in a lever 6 pivoted at 7 to the machine frame. A link 8 is pivoted to the lower arm of lever 6 and extends toward the rear of the machine. A shoulder 11 on link 8 lies behind a block 12 on another link 13 connected at its forward end to an arm 14 secured to a shaft 15 extending across the front of the machine. An arm 16, also secured to shaft 15, is pivoted to a link 17 connected at its rear end, by a pin and slot connection, to a stud 18 secured to a plate 21 pivoted on a shaft 22. An arm 23 secured to shaft 22 normally lies above a shoulder 24 on a cam 25 secured to a release shaft 26. A spring 27 secured to plate 21 normally holds these parts in the positions shown. An arm 28 extends upwardly from plate 21 and is connected to a link 31 extending toward the rear of the machine.

Depression of the motor bar oscillates lever 6 and pulls link 8 forward. Shoulder 11 pulls link 13 forward, rocking shaft 15 and pulling link 17 and plate 21 forward against the tension of spring 27. This rotates shaft 22, removing arm 23 from shoulder 24 and moving link 31 to the rear. The removal of arm 23 from shoulder 24 engages the clutch, and the movement of link 31 starts the electric motor in the manner disclosed in application Serial No. 581,800. The starting of the motor, together with the engaging of the clutch, causes the machine to operate. The parts are returned to their normal positions at the end of the operation in the same manner as disclosed in application Serial No. 581,800.

Carriage tabulating mechanism in general

Referring to Figure 5, a control plate 32 is attached to the rear of a paper carriage 33 to move therewith. Plate 32 carries a number of control magazines 34 rigidly secured thereto, certain of which are provided with control slides 35. These slides are mounted for sliding movement on control magazines 34 and are tensioned by springs 36 toward the rear of the machine, their rearward movement being limited by studs 37 extending through slots 38 in the slides. A release lever 41 pivoted in the machine frame normally lies in the path of lateral movement of the forward ends of control magazines 34 to stop the paper carriage by contact with the magazines, to properly position the carriage for printing in its several columnar positions. Normally, as disclosed in application Serial No. 581,800, this lever and its associated mechanism (not shown) are operated during each machine operation to allow the carriage to advance one columnar position. However, since it is desirable at times that one or more columnar positions be skipped, offset skip cams 42 are provided on slides 35 to co-operate with a stud 43 on release lever 41 to depress the lever from the path of the magazine to which the slide is attached. By this mechanism, when it is desired to skip a particular columnar position, it is only necessary to move slide 35 for that position forward a sufficient distance to place cam 42 in alinement with stud 43. Then as the carriage enters that columnar position, lever 41 is depressed, allowing the carriage to move to the next position without stopping. The means for moving the slide forward includes a cam slide 44 mounted on studs 45 for vertical movement. When it is desired to move slides 35 forward, it is only necessary to raise cam slide 44 from its normal position below the rear ends of slides 35 to one of its raised positions where it is in the path of the rear ends of these slides. Then as the carriage travels into a particular columnar position, the slide is cammed forward just before it reaches such position. Movement of cam slide 44 is controlled by a bail 46 pivoted on a rod 47 and having a long stud 48 contacting the lower edge of a shoulder 51 on cam slide 44. A spring 52 normally holds stud 48 in engagement with shoulder 51. From these parts it is obvious that oscillation of bail 46 will raise or lower cam slide 44 into or out of the path of slides 35. A spring 53 is connected to stud 48 and to the machine frame to urge cam slide 44 toward its upper position. Such movement, however, is regulated by a link 54 extending to the front of the machine. The adjustment of these parts under control of link 54 will be explained later. The details of construction of these parts and their operation is disclosed generally in application Serial No. 581,800, to which reference may be had for details not given here.

*Deposit and no deposit keys*

Two keys entitled deposit and no deposit are provided for selective column skipping to speed the posting operations and to require less manipulation by the operator. The deposit key, when depressed, causes the machine to tabulate from any columnar position on the left of the work sheet (Figure 29) directly to the deposit column. This key is useful in instances where there are no checks, or fewer checks than the number of columns assigned thereto, and a deposit is to be entered. The no deposit key causes the machine to tabulate directly from any position on the left side of the work sheet to the spacing cycle column for preparing the machine to take the new balance. This is useful where one or more checks are posted and there is no deposit. To further simplify the manipulations necessary in this work, these keys are provided with connections to the machine release mechanism so that depression of either key will act as a motor bar. By this provision, when the amount of the old balance or a check is set up on the amount keyboard, it is only necessary to depress the deposit or no deposit key to cause the machine to enter, in the appropriate column, the amount set up in the key board, and to then tabulate directly to the deposit or spacing cycle column, depending upon which of the two keys is depressed. The connections for starting the machine by these keys and for skip tabulating the carriage will now be explained.

Referring to Figure 7, a stud 55 is secured to the stem of the deposit key and lies above a bell crank 56 pivoted in the machine frame at 57, and having a stud 58 lying behind the rear end of a pitman 61 pivoted at 62 to the lever 6. Pitman 61 is slidable at its rear end on a stud 63. Depression of the deposit key will thereby move pitman 61 forward and rock lever 6 to start the machine, as above explained.

A stud 64 on the stem of the no deposit key lies above an arm of a bell crank 65 pivoted at 66 and having stud 63 secured on its lower arm. By these connections, depression of the no deposit key also will move pitman 61 forward to rock lever 6 and start the machine. The deposit and no deposit keys are normally held in their undepressed positions by springs 67 and 68 fastened to bell cranks 56 and 65 and to the frame of the machine. It will be noted that these keys have no latches to hold them in their depressed positions, it being necessary for the operator to hold them depressed until the carriage stops in the proper column.

The lower end of the deposit key stem lies above a stud 71 on an arm 72 of a bail 73 pivoted at 74. An arm 75 extends upwardly from the opposite end of the bail and carries a stud 76 extending through a slot 77 in link 54. Referring to Figure 6, link 54 is connected to bail 46 by a stud 78 extending through a slot 81 in the link. A spring 82 (Figure 7) normally holds arm 72 elevated and arm 75 forward. Another spring 83 normally holds link 54 forward. By these connections, depression of the deposit key moves link 54 a step to the rear, allowing spring 53 (Figure 6) to elevate cam slide 44 from its lowest or No. 1 position to its next lowest or No. 2 position. Referring to the top of Figure 29 opposite the designation "deposit key," it will be observed that when cam slide 44 is in this position it is lying at an elevation to be in the path of the rear ends of control slides 35 in the second, third, fourth, fifth, sixth, seventh and eighth columnar positions (see numbers at the bottom of the figure). Since, as also indicated in Figure 29, the control slides in these columnar positions are equipped with skip cams 42 on their forward ends, the carriage will be tabulated directly to the ninth or deposit column. By this means, when the carriage is at rest in the first columnar position, depression of the deposit key will start the machine to enter the old balance set up on the amount keyboard, and then cause the machine to tabulate until it reaches the deposit column, at which time the operator releases the deposit key and sets up the amount of deposit on the keyboard.

When there is no deposit to be entered, the carriage may be tabulated directly to the new balance column by depression of the no deposit key. To accomplish this, a stud 84 (Figure 7) is attached to arm 72 and lies directly under the lower end of the no deposit key stem. Since stud 84 is only about half as far from pivot 74 as is stud 71, cam slide 44 will be raised about twice as far, elevating the cam slide to its No. 3 position (Figures 6 and 29) where it lies in the path of the rear ends of control slides 35 in all the columnar positions from two to twelve. However, since control slide 35 in the tenth columnar position has no cam 42 to cause column skipping, the machine will stop in this position. As soon as the carriage stops, the operator releases the no deposit key and allows the machine to automatically perform a blank cycle in this position and to thereafter take the new balance.

*Taking a sub-total by depression of no deposit key*

In some instances there is a large number of checks to be posted to a single account, making it necessary to carry the posting from one ledger sheet to another. In such cases it is desirable to print the sub-total at the top of the second sheet in a special space designated "balance forward," as shown in Figure 29. Such a posting is illustrated by the $500.00 amount followed by an asterisk indicating a sub-total. To make such an entry it is necessary to shift several of the machine controls as follows:

The carriage control lug 85 for taking sub-totals, situated in the No. 5 carriage control position (see the numbers 1 to 18 at the left side of Figure 29), and normally ineffective in the 12th column, must be projected into effective position. The control lug 86 for entering amounts in the C register must be retracted to ineffective position so that this $500.00 amount will not be added to the accumulation of new balances. A motor repeat lug 88 must be retracted so that the machine will not operate as soon as it reaches the 12th position. This is necessary since the operator must take the completed work sheet from the machine and insert the new one. Further, a control lug 91 in the 18th control position is projected into effective position to disable the overdraft lock. As will be later explained, this overdraft lock prevents release of the machine whenever an overdraft appears in the crossfooter. The lock, however, is released (disabled), in a manner that will also be explained, by the carriage control in the 18th position. Operation of this control allows the sub-total to be printed regardless of its positive or negative character.

The mechanism for projecting or retracting the control lugs 85, 86, 88 and 91 is illustrated in Figures 10 and 11. These figures show these control lugs having pins extending from their sides and lying in small cam slots in control slide 92 on the left hand side of the control magazine 34 in the twelfth columnar position. It is apparent that the control lugs will be raised or lowered by forward movement of the control slide 92, depending upon the direction of the slots. The details of the mountings of the several movable lugs are explained in application Serial No. 581,800. It might be noted, however, that where a control lug is positioned opposite one of the studs that support slide 92 on its magazine, the control lug is widened so that the slot in the slide 92 for raising the lug may be cut in a position that will not interfere with the slide mounting. A plate 89 (Figure 27) is secured across the end of the magazine and has slots cut therein to accommodate and guide the control slides. Figure 10 illustrates slide 92 in its normal rear position with lugs 86 and 88 in their effective positions, and Figure 11 illustrates the operated position of slide 92 with lugs 85 and 91 in their effective positions.

From this disclosure, it is clearly seen that operation of slide 92 retracts lugs 86 and 88, designated "R" in Figure 29, and projects lugs 85 and 91, designated "P." The manner in which these lugs control the machine operation is more clearly illustrated in Figures 24 and 27 where it will be observed that movement of the carriage into a columnar position causes the control lugs to depress corresponding levers, such as 93, which in turn depress corresponding rods, such as 94. These rods operate various mechanisms to control the functions indicated in the 18 control positions in Figure 29. The mechanism for so controlling the machine functions, with one exception, is fully disclosed in application Serial No. 581,800, and will, therefore, not be given here. The exception mentioned is the overdraft lock release control in the 18th position, which will be later described.

In the operation of the above parts, to take a sub-total in the twelfth columnar position, it is only necessary to depress the no deposit key and hold it depressed until the machine operates through the blank cycle in the tenth column and comes to rest in the twelfth column. This will operate control slide 92 to properly set the controls for taking a sub-total. After the slide is shifted to its position shown in Figure 11, it is held in its operative position, after cam slide 44 (Figure 10) is allowed to return to its bottom position by release of the no deposit key, by studs 99 (Figure 11) on lugs 85 and 91 pressing upwardly (through the upward pressure on the lugs by their levers 93) against the upper edges of the short dwells in their respective cam slots, the friction created by the studs being sufficient to overcome the tendency of spring 36 to return slide 92 to the left. The completed sheet is then taken from the machine and a new sheet inserted. The sub-total may then be printed by depression of the motor bar or by again depressing the no deposit key.

*Locking the machine by overdraft*

In posting to an account it is sometimes desirable to lock the motor bar and other motor keys, as well as the carriage controlled motor repeat mechanism when a patron's account is overdrawn. It is desirable to have this lock effective in the new balance column so that the operator will be informed of the condition of the balance before it is printed as an overdraft balance. The following mechanism is provided for this purpose, the parts affecting the motor bar and the deposit and no deposit keys being given first.

A pitman 95 is slidable on a stationary stud 96 (Figure 18) and has an upstanding rear portion lying close to a roller 97 on an overdraft slide 98. The forward end of pitman 95 is pivoted to an arm 101 of a bail 102 (Figure 16) pivoted on a stationary bracket 103. An arm 104 is formed on the opposite end of the bail and has a laterally extending shoulder 105 on the forward end thereof. An arm 106 (Figures 15 and 16) is also pivoted on bracket 103 and has a forwardly extending finger 107 overlying shoulder 105. A lug 108 extends laterally from the mid portion of arm 106 and lies normally (Figure 16) to the rear but in the vertical plane of stem 4 of the motor bar. A pitman 111 is pivoted to arm 106 and is slidable at its rear end on a stationary bracket 112. An arm 113 extends downwardly from pitman 111 and has a shoulder at its lower end contacting the under side of stud 84.

As explained in application Serial No. 581,800, when an overdraft appears in the machine and no amount keys are depressed for the succeeding operation (blank cycle, totaling or sub-totaling), slide 98 (Figure 18) is moved forward in the machine. This movement of slide 98 causes roller 97 to contact pitman 95 and move it forward to the position shown in Figure 19, oscillating bail 102 and moving shoulder 105 downwardly. This allows a spring (Figure 15) to oscillate arm 106 (Figure 16) counter-clockwise to move lug 108 under the stem of the motor bar, and arm 113 (Figure 15) under stud 84. The parts are latched in this position by a shoulder 145 (Figure 19) on an arm 144, pivoted on a stud 141, being moved over shoulder 105 by the tension of a spring 146. This locks the motor bar and the deposit and no deposit keys against operation. A spring 114 (Figure 18) returns pitman 95 and the other parts to their normal positions when released from shoulder 145.

The following mechanism is provided to prevent an automatic new balance operation by the motor repeat lug 88 in the new balance column. Referring to Figure 20, a lever 115 is pivoted at 116 to the machine frame and is tensioned to the left by a spring 117. A hook 118 extends downwardly from lever 115 and lies against the right side of a stud 121 on a slide 122. A right angled shoulder 123 is formed on lever 115 and lies directly behind a vertically extending projection 124 on a link 125. As explained in application Serial No. 581,800, the motor repeat control lugs on the carriage depress a rod 126 to oscillate a bell crank 127 and move link 125 forward in the machine. Referring to Figure 4, forward movement of link 125 oscillates a bail 128 pivoted on a rod 131 and attached to link 13 at its opposite end. This moves link 13 forward and starts the machine. As also explained in application Serial No. 581,800, whenever an overdraft appears in the crossfooter, slide 122 (Figure 20) is moved to the left. This allows spring 117 to pull lever 115 to the left and place shoulder 123 in front of projection 124, thereby preventing release of the machine by the motor repeat lugs on the carriage.

*Overdraft lock release*

Since it is desirable that the overdraft lock be effective only in one column, and then only when a new balance is being taken, an automatic release mechanism that will be termed the "overdraft lock release" is provided. This mechanism is, as will become apparent, capable of releasing the overdraft lock in one or more columnar positions as desired, it being only necessary to provide the proper control lugs. The parts for performing this function will now be described.

A bell crank 132 is pivoted at 133 and contacts the lower end of rod 94. A link 134 contacts bell crank 132 and embraces a stud 135 on arm 136 pivoted at 137. A link 138 is pivoted on arm 136 and is slidable on stud 141. A finger 142 extends downwardly from link 138 and lies directly behind a stud 143 on arm 144. As explained above, shoulder 145 on arm 144 is adapted to latch shoulder 105 in its lower position when moved to that position by operation of the overdraft lock, spring 146 pulling the arm to effective position. By these connections, when an overdraft appears in the crossfooter and it is desired to operate the machine in a number of columns irrespective of the overdraft, a control lug is placed in the 18th control position for each of these columns, to depress lever 93 (Figure 18). When the lever is so depressed, as shown in this figure, links 134 and 138 are moved forward, moving arm 144 forward and holding it in this position when the carriage is in the columnar positions where the control lugs appear. With arm 144 so held, the overdraft lock mechanism is ineffective, since even though it is moved to effective position by a forward movement of slide 98 during the operation, it is returned immediately to its ineffective position shown in Figure 18, when slide 98 is returned during the latter part of the operation.

Referring to Figure 29, it will be seen that release lugs are provided in the first ten columns to be effective at all times, and in the eleventh and twelfth columns to be effective only under certain conditions. The lug in the eleventh position is effective during automatic register total operations, and the lug in the twelfth position during sub-total operations by the no deposit key.

In addition to the above described release parts, a means is also provided for releasing the carriage controlled motor repeat in those columnar positions where release lugs appear. This means includes a beveled shoulder 147 (Figure 20) on lever 115 lying directly in front of a downwardly extending shoulder 148 on link 134. By this means, when the lock release mechanism is operated by depression of rod 94, lever 115 is moved to the right against the tension of spring 117, withdrawing shoulder 123 from projection 124 to allow the motor repeat to operate under control of the carriage.

As described in application Serial No. 581,800, and as mentioned above, overdraft slide 98 (Figure 18) moves forward only when the crossfooter is overdrafted, and then only during operations where no amount keys are depressed. Under these conditions it might appear that links 134 and 138 and arm 144 are unnecessary, since by properly using the deposit and no deposit keys it is never necessary to start the machine except in those columns where an amount is to be entered. This, however, is not the case since many operators desire to tabulate the carriage one or more steps by depressing the motor bar, allowing the machine to make a blank cycle with the customary carriage tabulation of one step. For this reason it is necessary to provide the parts mentioned.

*Release of overdraft lock and operation of the machine by depression of the overdraft key*

Figure 2:
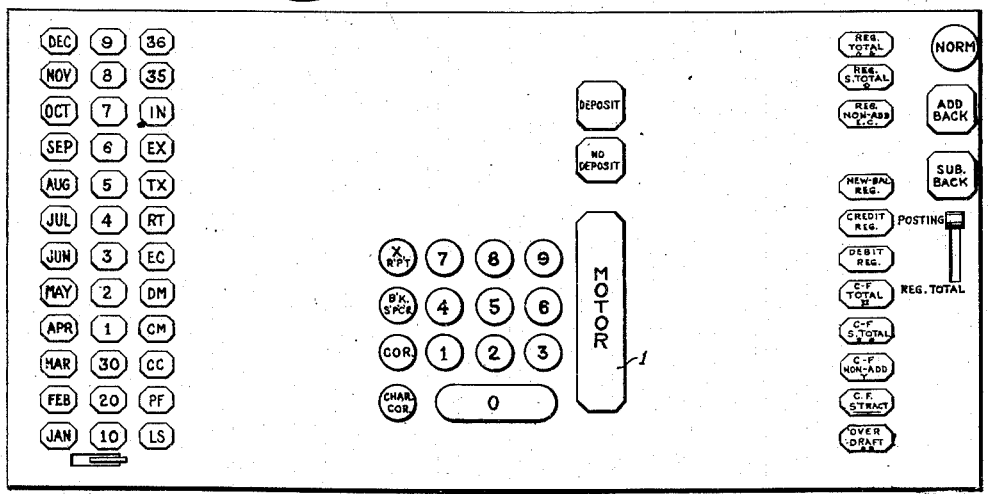
Figure 2 is a diagrammatic view of the keyboard.
Figure 3:
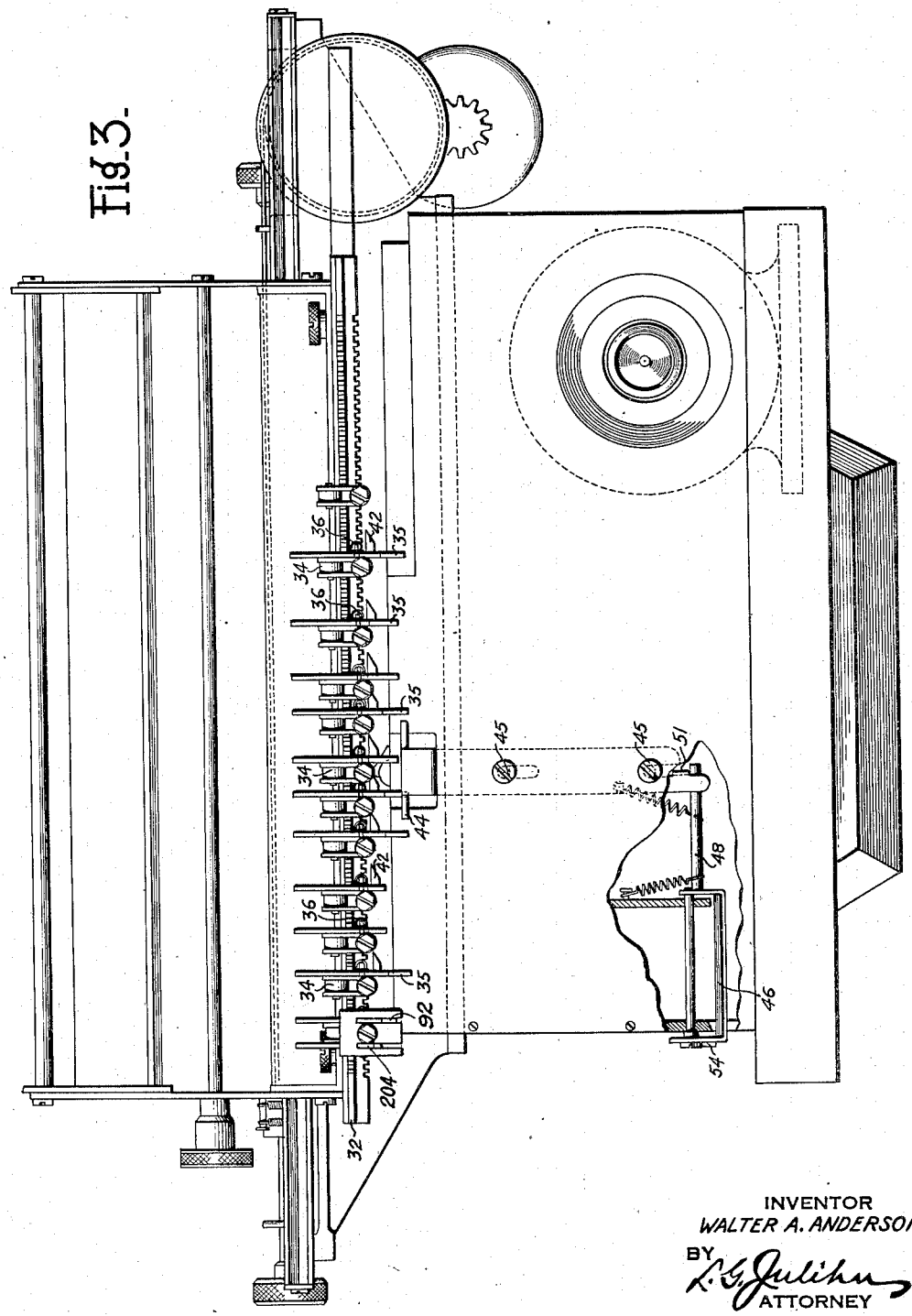
Figure 3 is a back elevation of the machine.

When the overdraft lock becomes effective by the lug 108 (Figure 16) moving under motor key stem 4, a slot 151 (Figure 16) in the upper portion of arm 106 moves a stud 152 forward to a position under a notch 153 in the rear portion of a lever 154 pivoted at 155 (Figure 15). Stud 152 is secured to a link 156 connected to lever 6. The overdraft key (Figures 2 and 14) has a stem 157 (Figures 14 and 16) lying directly above a flange 158 on a lever 161 pivoted at 162 to a stationary part of the machine. A spring 163 holds the right end of lever 161 normally elevated. A finger 164 on the left end of lever 161 lies under a finger 165 on a pawl 166 pivoted at 167 to an arm 168, also pivoted at 162. A spring 171 is connected to lever 161 and to arm 168. Depression of the overdraft key raises the left end of lever 161, stretching spring 171 and causing finger 164 to contact finger 165 and rotate pawl 166 counter-clockwise until a hook 172 on the lower portion thereof is moved from under a stationary bracket 173 against the tension of a spring 174. As soon as hook 172 leaves bracket 174, the tension of spring 171 lifts pawl 166 and arm 168, in turn raising the forward end of lever 154 and lowering link 156. This oscillates lever 6 and starts the machine. At the end of the operation when the overdraft key is released in the conventional manner, spring 163 (Figure 16) returns lever 161 and arm 168 to their normal positions. In this operation, an arm 169 extending over a lug 170 on the subtract key lowers the latter with the overdraft key to print the overdraft amount in red in the manner disclosed in application Serial No. 581,800.

When the machine is locked against operation through the overdraft lock, and also when the overdraft key is depressed to operate the machine, it is desirable that the amount keys be locked against depression. As explained in application Serial No. 581,800, the slight depression of a plate 175 (Figures 15 and 16) is sufficient to lock the amount keys. The following parts have, therefore, been provided to depress plate 175 when the lock operates or when the overdraft key is depressed. A bell crank 176 is pivoted at 7 and has a rearwardly extending arm 177 lying over the forward end of plate 175. A finger 178 (Figure 15) on the lower end of the bell crank lies directly in front of a stud 181 on an arm 182 secured to bail 102. A link 183 is connected to the bell crank 176 and to the forward portion of lever 154 by a pin and slot connection.

When the overdraft lock operates, arm 182 moves forward, rocking bell crank 176 clockwise to depress plate 175. Likewise, when the overdraft key is depressed, raising the forward portion of lever 154, link 183 is raised to likewise rock bell crank 176 to depress plate 175.

The overdraft lock may also be released by depression of the conventional normalizer key (Figure 17) through a cam surface on lever 179 acting on a stud 180 to move link 138 forward.

*Automatic printing of totals from registers*

Figure 1:
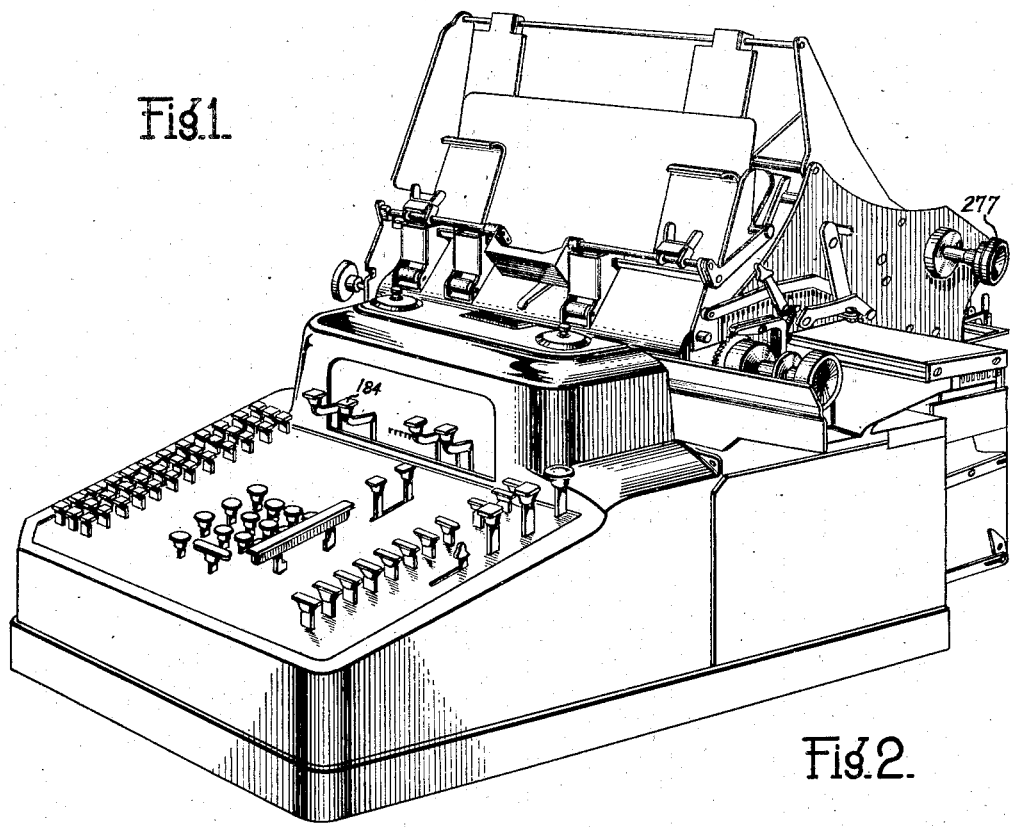
Figure 1 is a perspective of the machine.

At the end of a day's posting, it is desirable for the operator to take the totals from the A, B and C accumulating registers. This operation is performed by moving the register total lever (Figure 2) from its posting to its register total position and by depressing the motor bar or the conventional tabulating key 184 (Figure 1). The mechanism for performing this function will now be described.

The register total lever is pivoted at 185 (Figure 8) and has a downwardly extending arm 186 lying in front of a pin 187 on link 54. A roller 188 on arm 186 co-operates with a spring pressed detent 191 to hold the register total lever in either of its positions. Movement of this lever to its register total position shifts link 54 to its rearmost position, allowing spring 53 to elevate cam slide 44 to its highest or No. 4 position indicated in Figure 29. Referring again to Figure 8, an arm 192 is secured to the register total lever and has its forward end extending over the right end of lever 161 (Figure 16). Movement of the register total lever to its register total position lowers arm 192 and depresses lever 161. This raises the forward end of lever 154 and link 183 to lock the keyboard while the register total lever is in its register total position.

Referring now to Figure 29, it will be found that when cam slide 44 is in its register total position it does not contact slide 35 in the second column, which allows skip cam 42 in this position to remain in ineffective position, so that the carriage will stop in this column for an operation. Since the control magazine in this position contains a motor repeat lug 193 in operative position when slide 35 is not operated, the machine will be automatically operated through a blank cycle, and since another lug 194 is in position to select the A register, this register will be engaged to have the total taken therefrom during the next operation.

Since the slides 35 in the third and fourth columnar positions are moved by cam slide 44 when it is in its highest position, the skip cams 42 thereon cause the carriage to tabulate through these columns. Slide 35 in the fifth columnar position will not contact cam slide 44, causing the carriage to stop in the fifth position for another cycle. The magazine in this position carries a motor repeat lug 195, a lug 196 to select the A register, a lug 197 to condition the machine for taking a total from the register and a lug 198 to prevent the total from being added into the crossfooter. By these lugs it is apparent that the machine will be automatically cycled to take the total from the A register, this being the total amount of the checks posted during the day's run. The carriage then skips column No. 6 and stops at column No. 7 for a blank cycle similar to that taken in the second column, this time, however, selecting the B register. At the end of this cycle, the carriage continues to the eighth columnar position where an operation similar to that in the fifth column will take place, with the exception that the B register is selected instead of the A. This causes the total to be taken from the B register, representing the total deposits posted during the day's run. The carriage then skips the ninth position and moves into the tenth. In this position, although the control slide 35 is moved forward, the column will not be skipped, due to the absence of a skip cam 42 on the forward end of the slide 35. The presence of a motor repeat lug 202 in this position and a lug 203 to select the C register causes the machine to take a blank cycle and select the C register preparatory to taking a total therefrom. The operation of control slide 35 projects a lug 201 to prevent the C register signal from being printed during this operation. The machine then tabulates and stops in the eleventh column, where an operation similar to those in the fifth and eighth positions take place, to take the total of the new balances from the C register. The carriage then advances to the twelfth columnar position where cam slide 44 operates a control slide 204 (Figure 12) to its position shown in Figure 13. With slide 204 in this position and slide 92 (Figure 10) on this same magazine 34 in unoperated position, the effective lugs in this position are numbers 86, 88, and a lug 205 projected by operation of slide 204. Although lug 86 is effective to select the C register, the cycle in effect is a blank cycle so that this lug performs no function. Lug 205 prevents printing of any signals during this operation and lug 88 operates the machine to allow it to tabulate to the end of its working stroke where the mechanism disclosed in application Serial No. 581,800 causes the carriage to return to its initial right hand position. It is necessary to operate the machine through a blank cycle in the twelfth position since the complicated nature of the magazine 34 in this position does not lend itself to placing a skip cam 42 thereon.

Add back and subtract back keys

As explained above, add back and subtract back keys are provided for correcting the erroneous entry of a check or deposit. As also mentioned above, it is necessary not only to correct the erroneous amount in the crossfooter by duplicating the entry in the opposite direction, but to prevent the correction entry from being entered in the accumulating register customarily selected in whatever position the correction is made. For instance, when an erroneous entry of a check is being corrected, it is customary to correct it in one of the check columns and, as explained above, when the machine is in one of the check columns the A register for accumulating checks is automatically selected. The same applies for the correction of deposits.

To correct the amount in the crossfooter, the add back key is provided with a means to hold the subtract control in ineffective position so that the correction amount will be entered positively to offset the erroneously subtracted amount of the check. Likewise, the subtract back key operates the means to depress the subtraction control to effective position to subtract the amount erroneously added to the crossfooter. To prevent the introduction of these correction amounts in the accumulating registers, both the add back and subtract back keys depress the register non-add control that prevents engagement of the accumulating registers during these operations.

Also, since at times it is desirable to make corrections in the new balance column, the add back and subtract back keys operate a means to hold the crossfooter total and sub-total keys in ineffective position so that addition and subtraction may be performed in the new balance column where these total controls are automatically operated. Further, since the machine release keys may be locked by the presence of an overdraft in the crossfooter, it is desirable to operate the overdraft lock release by depression of either of these keys so that the machine may be operated in this new balance column regardless of such overdraft. For this purpose both the add back and subtract back keys operate a means to depress the overdraft lock release lever 93 in the 18th control position. The mechanism for accomplishing these results will now be described.

Referring to Figures 23 and 26, the add back key is formed on the forward end of a lever 206 pivoted on a stud 207 and connected at its rear end by a pin and slot connection with a vertically reciprocable slide 208 guided on stationary studs 211 and 212. A projection 213 on the upper end of slide 208 lies under a subtraction control lever 214 in the 2nd control position. Another vertically reciprocable slide 215 is guided on studs 212 and 216, and has a flange 217 overlying the rear end of lever 206. A projection 218 extends from the upper end of slide 215 and lies under two levers 221 and 222 in the 4th and 5th control positions, for controlling totaling and sub-totaling in the crossfooter. A lever 223 is pivoted at 224 and rests at its forward end on a shoulder 225 on slide 208. The rear end of lever 223 rests on a shoulder 226 on a slide 227 guided by studs 228 and 231. The upper end of slide 227 has two slotted arms 232 and 233 embracing the ends of two levers 234 and 93 in the 8th and 18th control positions. Lever 234 operates the register non-add mechanism and lever 93, as explained above, releases the overdraft lock.

Figure 23 illustrates the normal position of these parts and Figure 26 illustrates their operated position. As shown in Figure 26, when the add back key is depressed, subtraction control lever 214 and the total and sub-total control levers 221 and 222 are held against depression, while the register non-add lever 234 and the overdraft lock release lever 93 are depressed. This places the controls in the desired position, as explained above.

Referring now to Figure 25, the subtract back key is formed on the forward end of a lever 235 pivoted at 236, connected by a pin and slot connection at its rear end with a lever 237 pivoted on stud 238. The rear end of lever 237 is connected by a pin and slot connection with a slide 241 guided on studs 238, 212 and 243. An arm 244 extends above the upper edge of slide 241 and has a flange 245 extending inwardly therefrom. Flange 245 lies above the end of subtraction control lever 214. A stud 247 is secured to slide 227 and extends under slide 241. Flange 217 on slide 215 is sufficiently broad (Figure 27) to extend over the rear end of lever 235 as well as lever 206.

By these connections, depression of the subtract back key lowers slide 241 and thereby depresses the crossfooter subtract lever 214 to subtract the amount erroneously added in the crossfooter. The lowering of plate 241 lowers slide 227 through contact with stud 247 and thereby depresses levers 234 and 93 to prevent accumulation in the registers and to release the overdraft lock. Slide 215 is raised because of flange 217, whereby levers 221 and 222 for controlling totaling and sub-totaling in the crossfooter are held in their ineffective positions.

It will be observed that depression of these two keys has the same effect on the control levers except that the add back key holds the crossfooter subtraction control lever 214 in undepressed position so that an erroneous check entry may be added back to a patron's balance, while the subtract back key depresses lever 214 to cause an erroneous deposit entry to be subtracted back from a patron's balance.

The add back and subtract back keys are held in their depressed position by a detent 249 (Figure 23), and are released at the end of the operation by a slide 250 connected to the conventional key release mechanism as disclosed in application Serial No. 581,800.

Printing identifying symbols for different types of operations, and for the accumulating registers in the automatic totaling operation To identify such printed data as overdrafts, totals taken from the registers, et cetera, a special type bar 248 (Figure 21) is provided. As explained in application Serial No. 581,800, the positioning of this type bar is controlled by depression of the control keys moving rods 251 into the path of upward movement of a rod 252 connected to the type bar. Therefore, to have the proper symbol printed, it is necessary to depress the corresponding control key, either manually or by the paper carriage. Since in practice these keys are usually automatically depressed under control of the carriage, it is necessary to provide positive connections between the keys and the elements operated by the carriage. Such connections are shown in Figures 21 and 22 and include links such as 253 fastened to the key stem at 254 and to a bail 255 extending under the key stem. A loop 256 extends forward from the bail 255 and embraces an upstanding arm 257 on a link 258 extending rearwardly into contact with one of the levers similar to 261 oscillated by its corresponding carriage control lever. By these connections, operation of the carriage control levers pushes their corresponding links forward, pulling link 253 down to depress its associated key and move the associated rod 251 into the path of rod 252.

The present disclosure shows such connections (Figure 21) only for the sub-total, total and cross-footer non add (error corrected) key. It will be evident, however, that similar connections could be provided for any of the other keys if in the work to be performed by the machine it should be advantageous.

Another type of connection between the control keys and the bails 255 is illustrated in Figure 9 associated with the keys for selecting the A, B and C accumulating registers. This connection includes links 262 connected to bails 255 and having hooks 263 on their upper ends. A bar 264 has pins extending through slots in the links 262. This bar is rigidly secured to the stem of the register total lever by a long stud 265.

Since, when these three registers are engaged during posting operations, for entering checks and deposits, and for taking new balances, it is not desired to have the appropriate symbol printed on the statement sheet, the positive type of connection illustrated in Figure 22 cannot be employed. However, since it is desired to have these three control keys engaged for depression during the automatic printing of the totals at the end of a day's run, so that these various totals can be readily identified, the type of connection shown in Figure 9 is employed. By these connections, movement of the register total lever to total taking position moves the three hooks 263 into engagement with arms 266 on the key stems so that when the links 258 are pushed forward selectively under control of the carriage during the automatic total operation, the appropriate keys successively are pulled down to control the movement of type bar 248 (Figure 21) to print the corresponding symbols alongside the printed totals as illustrated at the bottom of Figure 29.

Adjustable paper stops

When posting entries to patron's accounts, it is necessary to insert the statement sheets of the various patrons different distances in the machine, since the statement sheets have different amounts of postings already entered thereon. In order to get the sheets alined in the machine with sufficient accuracy to have the different lines of posted entries parallel with one another, it has been found advantageous to employ an adjustable stop mechanism such as shown in Figure 28.

This mechanism includes two pairs of grooved strips 267 extending from the rear of the paper carriage to a position under the platen. The grooves in these strips accommodate thin flexible strips 268 having lugs 271 on their forward ends to act as paper stops. These strips extend rearwardly and enter drums 272, in which they are coiled, the inner ends of the strips being secured to a shaft 273 extending through drums 272. These drums include side plates and rigid peripheral walls 274. Small openings are cut in walls 274 to accommodate anti-friction rollers 275 mounted on spindles 276 journaled in the side walls. Shaft 273 extends through the right hand end wall of the carriage and carries a hand wheel 277.

When the operator wishes to insert a statement sheet in the machine through the front paper feed mechanism, such as disclosed in application Serial No. 610,043, he introduces it with his left hand and adjusts the paper stops 271 with his right hand by turning wheel 277. By inserting the statement sheet a fraction of an inch more than necessary and by rotating wheel 277 a small amount to bring the paper up to the desired position, perfect alinement of the sheet may be obtained.

Two or more paper guides such as 278 may be employed to prevent the rear edge of the statement sheet from rising above stops 271.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In an accounting machine having a general actuating mechanism, a printing mechanism operated thereby, a traveling paper carriage, means to move the carriage during its working and return strokes, and tabulating means operated by the general actuating mechanism and normally effective to release the carriage for movement from one columnar position and to arrest the carriage in the next columnar position, the combination of two manipulative members, means operated by either manipulative member to start the actuating mechanism to effect printing and to release the carriage for tabulation to the next column, means, operative after the carriage is released, to render the tabulating means ineffective to arrest movement of the carriage in a plurality of its columnar positions, and means operated by the manipulative members to control the operation of the last named means to vary the columnar positions to be skipped.

2. In an accounting machine having a general actuating mechanism, a printing mechanism operated thereby, a traveling paper carriage, means to move the carriage during its working and return strokes, and tabulating means operated by the general actuating mechanism and normally effective to release the carriage for movement from one columnar position and to arrest the carriage in the next columnar position, the combination of two manipulative members, means operated by either manipulative member to start the actuating mechanism to effect printing and to release the carriage for tabulation to the next column, an element mounted on a stationary part of the machine, a plurality of parts movably mounted on the carriage and having portions traveling in different paths as the carriage travels, the said element being adjustable into and out of the paths of the said parts to operate or not operate the parts as the carriage travels, means operated by the said parts to render ineffective the tabulating means, and means whereby selective operation of the manipulative members moves the said element different distances to place it in the paths of different ones of said parts.

WALTER A. ANDERSON.